United States Patent [19]
Petersen

[11] Patent Number: 5,758,635
[45] Date of Patent: Jun. 2, 1998

[54] GAS GRILL WITH ADJUSTABLE HEATING ELEMENT

[76] Inventor: Roy V. Petersen, 211 Tanglewood, East Piscataway, N.J. 08854

[21] Appl. No.: 885,180

[22] Filed: Jun. 30, 1997

[51] Int. Cl.6 .................................................. F24B 3/00

[52] U.S. Cl. ......................................... 126/25 A; 126/41 R

[58] Field of Search .............................. 126/41 R, 25 A

[56] References Cited

U.S. PATENT DOCUMENTS 4,658,710  4/1987  Quet et al. ........................ 126/25 A Primary Examiner—Carroll B. Dority

[57] ABSTRACT

In its broadest context, the present invention relates to an adjustment mechanism for the firebox of a grill. The adjustment mechanism includes both an adjustment crank and a clutch brake. The adjustment crank, by way of a pulley, can be used to raise and lower the height of the firebox within the grill frame. Additionally, the clutch brake is used to lock the firebox in position once a desire height is achieved.

5 Claims, 3 Drawing Sheets

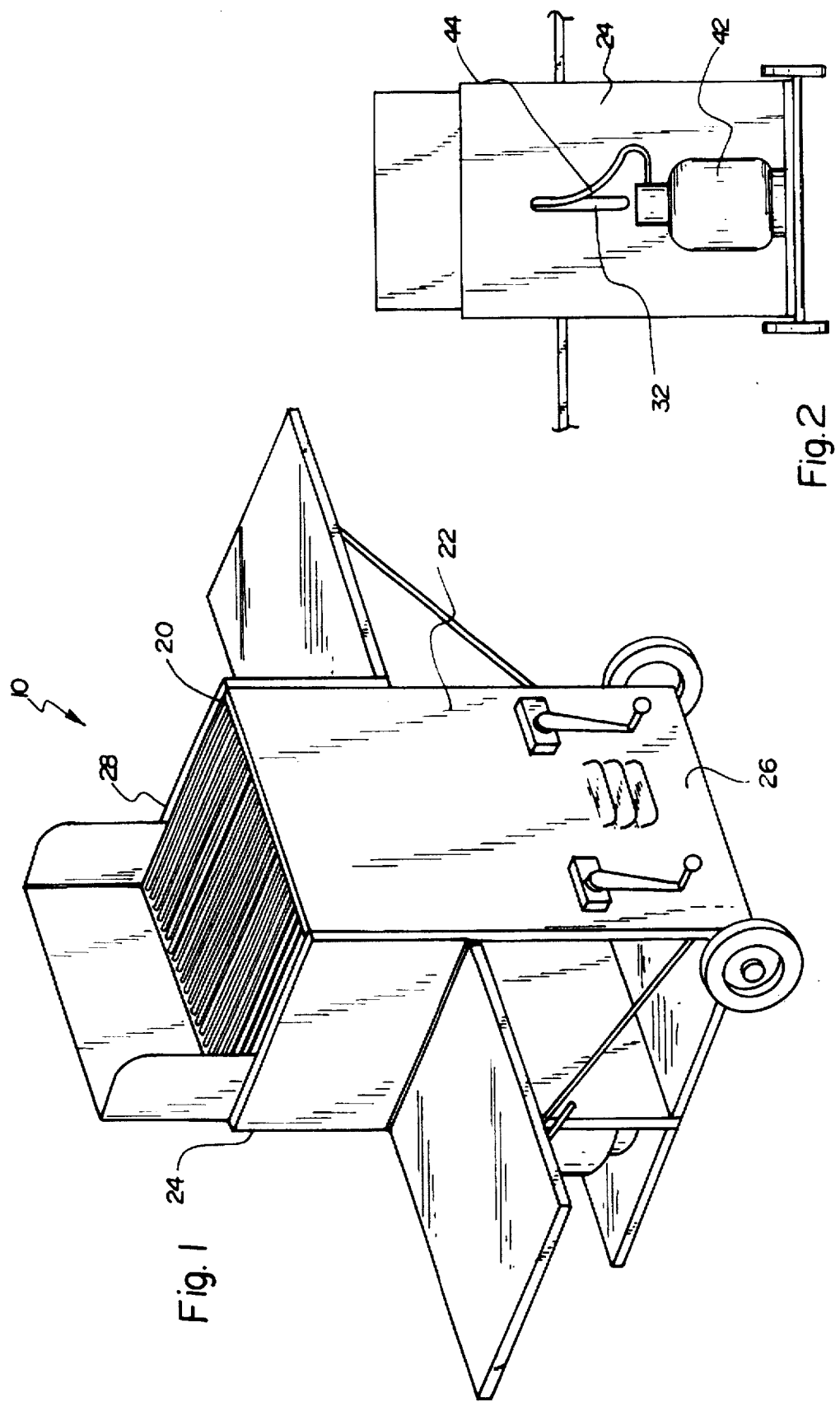

5,758,635

GAS GRILL WITH ADJUSTABLE HEATING ELEMENT

BACKGROUND OF THE INVENTION

1. Field of the Invention

The present invention relates to a gas grill and more particularly pertains to a gas grill with means to control the height of the heating element.

2. Description of the Prior Art

The use of grills is known in the prior art. More specifically, grills are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,178,126 to Beller discloses an adjustable barbecue grill. U.S. Pat. No. 4,462,306 to Eisendrath discloses an adjustable cooking grill. U.S. Design Pat. No. 252,248 to Huff discloses a gas barbecue grill. U.S. Pat. No. 4,926,838 to Sells illustrates a charcoal grilling unit. U.S. Pat. No. 4,627,410 to Jung discloses a barbecue grill construction. Lastly, U.S. Pat. No. 4,541,406 to DaSambiagio discloses a portable grill construction.

In this respect, the gas grill of the present invention substantially departs from the conventional concepts and designs of the prior art, and in so doing provides an apparatus primarily developed for the purpose of enabling a user to control the height of the heating element.

Therefore, it can be appreciated that there exists a continuing need for grills with improved heating elements. In this regard, the present invention substantially fulfills this need.

SUMMARY OF THE INVENTION

In view of the foregoing disadvantages inherent in the known types of grills now present in the prior art, the present invention provides a grill with an adjustment means for the heating element. As such, the general purpose of the present invention, which will be described subsequently in greater detail, is to enable the easy adjustment of the grill's heating element.

To attain this, the present invention essentially comprises an adjustment mechanism for the firebox of a grill. The adjustment mechanism includes both an adjustment crank and a brake. The adjustment crank, by way of a pulley, can be used to raise and lower the height of the firebox within the grill frame. Additionally, the brake is used to lock the firebox in position once a desire height is achieved. The various components of the present invention, and the manner in which they interrelate, will be described in greater detail hereinafter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved grill with height adjustment means for the heating element.

It is another object of the present invention to provide a gas grill with means to adjust the height of the fuel intake.

It is a further object of the present invention to provide a gas grill with an interconnection between the gas and heating element that allows for the height adjustment of the heating element.

An even further object of the present invention is to gas grill which is susceptible of a low cost of manufacture with regard to both materials and labor, and which accordingly is then susceptible of low prices of sale to the consuming public, thereby making such gas grill economically available to the buying public.

Still yet another object of the present invention is to provide a gas grill which provides in the apparatuses and methods of the prior art some of the advantages thereof, while simultaneously overcoming some of the disadvantages normally associated therewith.

Lastly, it is an object of the present invention to provide a new and improved gas grill with means to adjust the rate of cooking. The grill includes a grill frame defined by a front surface, a rear surface, a lower extent, an upper extent and a hollow interior. Additionally, a vertical slot is positioned within the rear surface. The firebox is positioned within the hollow interior of the grill frame. This firebox contains a heating element. The heating element includes an intake for the supply of a fuel. A fuel supply is secured to the lower extent of the grill frame. A length of tubing interconnects the fuel supply and the heating element intake. The length of tubing is positioned through the vertical slot of the rear surface of the grill frame. The grill of the present invention also includes a firebox adjustment mechanism. This mechanism includes a crank, a brake, a lower pulley and an upper pulley. All these elements are pivotally secured to the front wall of the grill frame. A metal cable which is defined by a first end secured to the crank and a second end secured to the fire box is employed by the adjustment mechanism. The metal cable also includes an intermediate extent which is interconnected with the upper pulley, the lower pulley and the brake. Rotation of the crank serves to raise and lower the firebox. Additionally, rotation of the brake in a first sense locks the metal cable in place while rotation of the brake in a second sense unlocking the metal cable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 a perspective view of the gas grill of the present invention.

FIG. 2 is rearview of the gas grill of the present invention.

Similar reference characters refer to similar parts throughout the several views of the drawings.

DESCRIPTION OF THE PREFERRED EMBODIMENT

Figure 3:
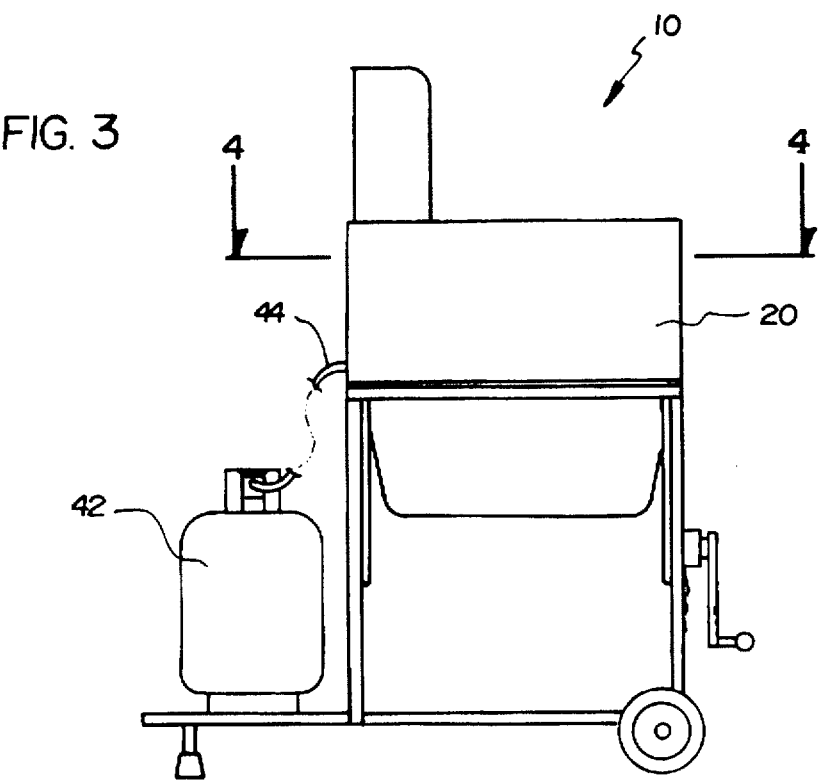
FIG. 3 is side view of the gas grill of the present invention.

With reference now to the drawings, and in particular to FIG. 1 thereof, the gas grill construction of the present invention is depicted. In its broadest context, the present invention relates to an adjustment mechanism for the firebox of a grill. The adjustment mechanism includes both an adjustment crank and a brake. The adjustment crank, by way of a pulley, can be used to raise and lower the height of the firebox within the grill frame. Additionally, the brake is used to lock the firebox in position once a desire height is achieved. The various components of the present invention, and the manner in which they interrelate, will be described in greater detail hereinafter.

The gas grill 10 of the present invention includes a means to adjust the rate of cooking. The grill 10 of the present invention includes a grill frame 20 defined by a front surface 22, a rear surface 24, a lower extent 26, an upper extent 28 and a hollow interior. Additionally, a vertical slot 32 is positioned within the rear surface 24 of the grill frame 20. The function of this vertical slot 32 will be described in greater detail hereinafter.

Figure 4:
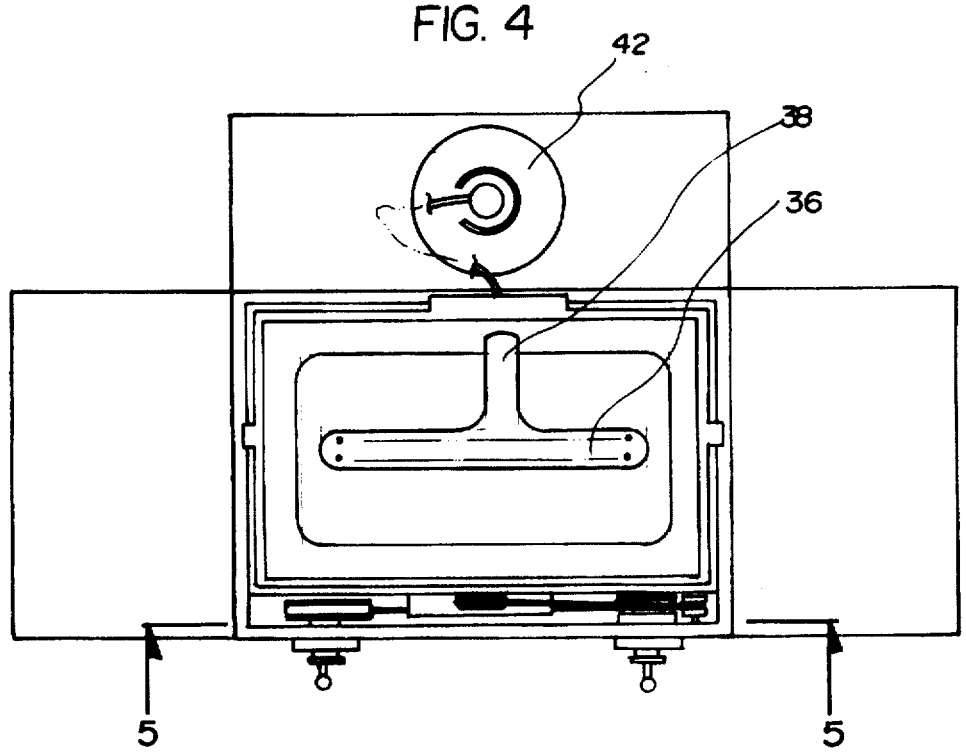
FIG. 4 is a view taken along line 4—4 of FIG. 3.

The grill 10 of the present invention also includes a firebox 34. This firebox 34 is positioned within the hollow interior of the grill frame 20. Rails or other securing means can be employed in slidably securing the firebox 34 to the interior of the grill frame 20. The firebox 34, in turn, contains a heating element 36. This heating element 36 is best depicted in reference to FIG. 4. With continuing reference to FIG. 4, the intake 38 of the heating element 36 is also depicted. The heating element intake 38 is for supplying fuel to the heating element 36.

The grill 10 of the present invention also includes a fuel supply 42. In the preferred embodiment, this fuel supply 42 is secured to the lower extent 26 of the grill frame 20. A length of tubing 44 serves to interconnect the fuel supply 42 to the heating element intake 38. As illustrated in reference to FIG. 2, the length of tubing 44 is positioned through the vertical slot 32 of the rear surface 24 of the grill frame 20. Thus, tubing 44 can travel with the firebox 34 as it is adjusted vertically.

Figure 5:
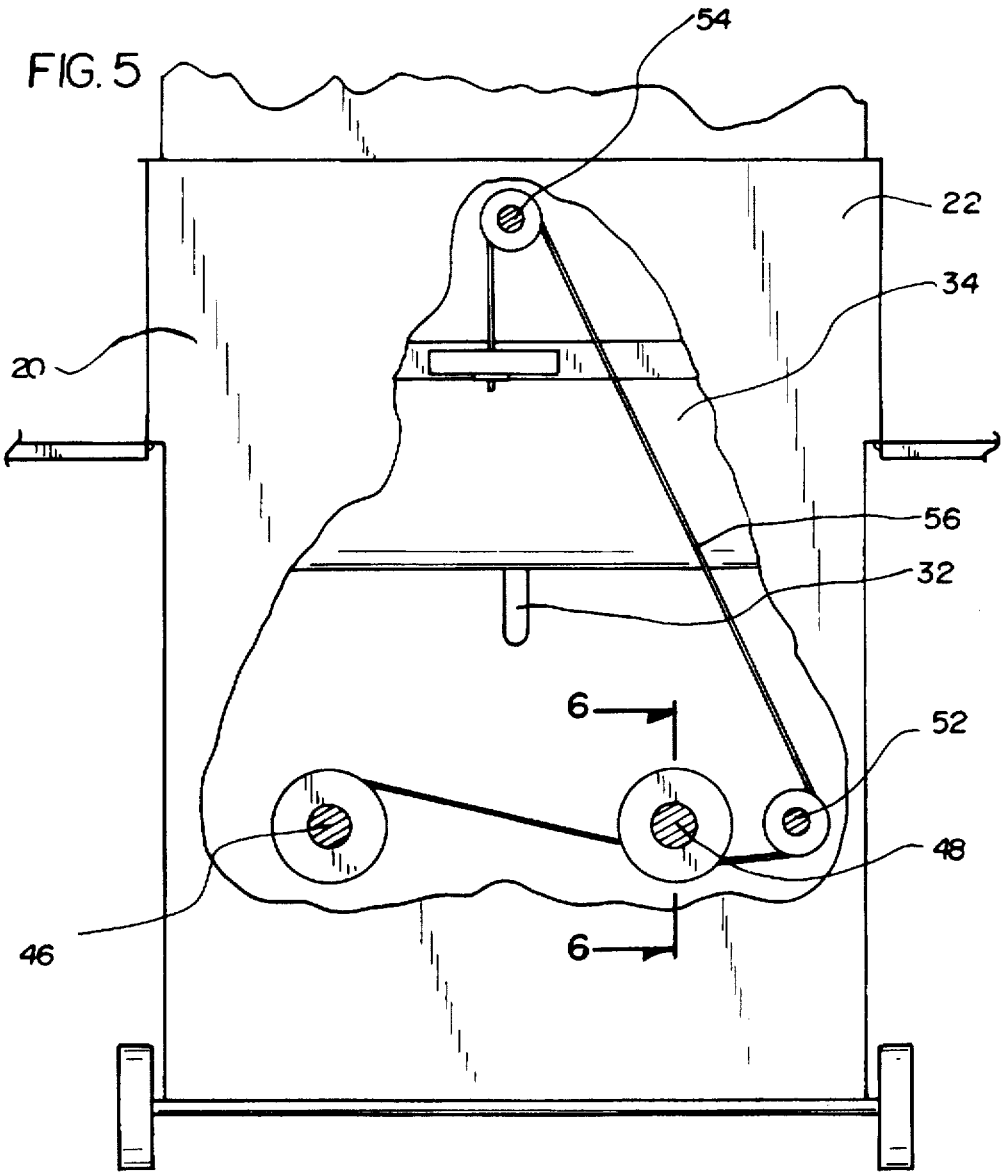
FIG. 5 is a view taken along line 5—5 of FIG. 4.
Figure 6:
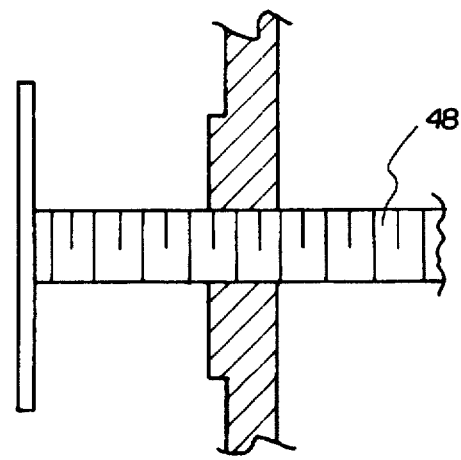
FIG. 6 is a view taken along line 6—6 of FIG. 5.

The firebox 34 is adjusted vertically via the firebox adjustment mechanism. This mechanism will be described in detail hereinafter. As illustrated in FIG. 5, the adjustment mechanism includes: a crank 46; a brake 48; a lower pulley 52; and an upper pulley 54. All of these elements are pivotally secured to the front wall 22 of the grill frame 20. The adjustment mechanism also includes a metal-cable 56. This cable 56 has a first end, which is secured to the crank 46, and a second end, which is secured to the fire box 34. The metal cable 56 also has an intermediate extent that is interconnected with the upper pulley 54, the lower pulley 52 and the brake 48. Both the upper 54 and lower pulleys 52 provide a mechanical advantage to the adjustment mechanism. In operation, rotation of the crank 46 serves to raise and lower the firebox 34. Specifically, rotation of the crank 46 in a First sense causes the cable 56 to be wound upon the crank 46. This, in turn, causes the firebox 34 to be raised and the heating element 36 brought closer to the grill surface. Additionally, rotation of the brake 48 in a first sense locks the metal cable 56 in place. Thus, once the firebox 34 is adjusted to the desired height, the brake 48 is rotated to secure the firebox 34 in place. Rotation of the brake 48 in a second sense unlocks the metal cable 56. In the preferred embodiment, the brake 48 takes the form of a threaded element, which when the brake 48 is locked, secures the cable 56 adjacent a securing disk. The brake is depicted in FIG. 6.

In operation, the heating element is first ignited. Next, the brake is rotated to an unlock position. The firebox can now be freely adjusted. The crank is then rotated in the proper sense to either raise or lower the firebox. Once the proper height adjustment is achieved, the brake is again rotated to lock the metal cable and keep the firebox at its desired height.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gas grill with means to adjust the rate of cooking comprising in combination:

a grill frame having a front surface, a rear surface, a lower extent, an upper extent and a hollow interior, a vertical slot positioned within the rear surface;

a firebox positioned within the hollow interior of the grill frame, the firebox containing a heating element, the heating element having an intake for the supply of a fuel;

a fuel supply secured to the lower extent of the grill frame, a length of tubing interconnecting the fuel supply and the heating element intake, the length of tubing being positioned through the vertical slot of the rear surface of the grill frame;

a firebox adjustment mechanism, the mechanism including a crank, a brake, a lower pulley and an upper pulley all pivotally secured to the front wall of the grill frame, a metal cable having a first end secured to the crank and a second end secured to the fire box, the metal cable also having an intermediate extent interconnected with the upper pulley, the lower pulley and the brake, rotation of the crank serving to raise and lower the firebox, rotation of the brake in a first sense locking the metal cable in place and rotation of the brake in a second sense unlocking the metal cable.

2. A gas grill with means to adjust the rate of cooking comprising in combination:

a grill frame having a front surface, a rear surface, a lower extent, an upper extent and a hollow interior;

a firebox positioned within the hollow interior of the grill frame;

a firebox adjustment mechanism, the mechanism including a crank, a brake, all pivotally secured to the front wall of the grill frame, a cable having a first end secured to the crank and a second end secured to the fire box, the cable also having an intermediate extent interconnected with the brake, rotation of the crank serving to raise and lower the firebox, rotation of the brake in a first sense locking the cable in place and rotation of the brake in a second sense unlocking the cable.

3. The gas grill as described in claim 2 further comprising:

a vertical slot positioned within the rear surface of the grill frame;

a heating element positioned within the firebox, the heating element having an intake for the supply of fuel;

a fuel supply secured to the lower extent of the grill frame, and a length of tubing interconnecting the fuel supply and the heating element intake, the length of tubing being positioned through the vertical slot of the rear surface of the grill frame.

4. The gas grill as described in claim 2 wherein:

the firebox adjustment mechanism includes both an upper pulley and a lower pulley, with both the upper and lower pulley being interconnected to the intermediate extent of the cable.

5. The gas grill as described in claim 2 further wherein:

the cable of the adjustment mechanism is formed from a metal.

* * * * *